United States Patent [19]

Blausey, Jr.

[11] 4,071,344
[45] Jan. 31, 1978

[54] GLASS SHEET TEMPERATURE CONTROL APPARATUS AND METHOD

[75] Inventor: Richard H. Blausey, Jr., Toledo, Ohio

[73] Assignee: Libbey-Owens-Ford Company, Toledo, Ohio

[21] Appl. No.: 732,319

[22] Filed: Oct. 14, 1976

[51] Int. Cl.² ............... C03B 23/02; C03B 29/04
[52] U.S. Cl. .................................. 65/29; 65/119; 65/162; 65/163; 65/DIG. 13
[58] Field of Search ............... 65/162, 163, 29, 273, 65/DIG. 13, 119

[56] References Cited

U.S. PATENT DOCUMENTS

| 3,479,172 | 11/1969 | McCown et al. | 65/162 X |
| 3,744,985 | 7/1973 | Peternel | 65/162 X |

*Primary Examiner*—Arthur D. Kellogg
*Attorney, Agent, or Firm*—Collins, Oberlin &Darr

[57] ABSTRACT

A method of and apparatus for controlling the temperatures of glass sheets moving bodily through a furnace by automatically varying the heat exposure time of the sheets in the furnace in accordance with temperature variations from a desired level detected in heated sheets exiting the furnace.

9 Claims, 2 Drawing Figures

GLASS SHEET TEMPERATURE CONTROL APPARATUS AND METHOD

BACKGROUND OF THE INVENTION

The present invention relates generally to the production of glass sheets and, more particularly, to an improved method of and apparatus for precisely controlling the temperatures of heated glass sheets in a mass production operation.

One process that has been successful in producing bent, tempered sheets of glass, such as are commonly used in glazing closures for automobiles and the like, is the horizontal press bending technique. This technique generally includes heating pre-trimmed flat sheets of glass to their softening or bending temperatures by advancing them on a roll conveyor through a heating furnace, bending the heated sheets to a desired curvature or shape between a pair of complementary mold members and then tempering the same by chilling the bent sheets in a controlled manner to a temperature below the annealing range of glass.

It should be appreciated that the glazing closures formed by the above-described process must be bent to precisely defined shapes as dictated by the configuration and size of the sight openings and the overall styling of the vehicles in which the closures are to be installed. Moreover, the glazing closures must be properly tempered to increase their resistance to damage resulting from impact and, in the event of breakage, to fragment into relatively small harmless particles as opposed to the large, jagged, potentially dangerous pieces otherwise resulting from untempered glass sheets when broken. Additionally, the bent and tempered glazing closures must meet stringent optical requirements whereby they are free of surface defects and optical distortions that would interfere with clear vision therethrough.

Probably the single most significant factor in meeting all of the above-mentioned requirements resides in heating the sheets to an optimum temperature level during the heating phase to properly condition the glass sheets for further processing. If a heated sheet exits the heating furnace at a relatively cool temperature for example, it will not be sufficiently soft for expedient and proper bending. Moreover, it will not retain the necessary heat required for subsequent tempering. On the other hand, if the sheet leaving the furnace is overheated, it will be extremely pliable with attendant loss of deformation control and will tend to sag out of the desired shape beyond the close tolerances prescribed. Also, overheating tends to degrade the surface quality of the finished product as a result of heat stains, roll marking, pitting and the like. While the optimum temperature range to which the sheets must be heated for satisfactory further processing can be readily calculated, problems are encountered in consistently reaching this desired temperature level and maintaining a multiplicity of glass sheets within such range in a mass production operation. This is due to the inherent, although slight, temperature variations generated by the irregular heat output of the heating elements, whether gas fired or electrical resistance elements, within the furnace and from other extraneous sources which influence the temperature of the heating atmosphere. In any event, it has been found that the temperatures of successive sheets exiting the furnace, as monitored by sophisticated temperature measuring devices, varies frequently and sometimes from sheet to sheet.

Attempts have been made to solve this problem by varying the thermal input to the heating elements in accordance with glass temperature variations from a desired level. However, these attempts haven't been entirely satisfactory because of a lagging heat input response, i.e., a time delay before the adjusted thermal input is adequately reflected in the heating atmosphere and imparted to the advancing glass sheets. Other attempts involve manually adjusting the rate of conveyor speed to compensate for temperature variations. However, it is virtually impossible to manually effect the necessary adjustments accurately in a minimum of time because of human error and/or miscalculations, thus seriously impairing efficiency in a mass production operation. Moreover, the complete concentration and constant surveillance required of the operator contributes significantly to fatigue, further increasing the possibilities of human error and poor judgment.

SUMMARY OF THE INVENTION

Accordingly, it is an object of the present invention to obviate the above shortcomings by providing an improved method of and apparatus for accurately controlling the temperature of heated glass sheets within a desired range in a mass production operation.

It is another object of this invention to provide a new and useful method of and apparatus for automatically adjusting the rate of advance of glass sheets through a heating furnace in response to temperature variations in glass sheets exiting the furnace to thereby vary the exposure time of the sheets to heat.

The foregoing and other objects, advantages, and characterizing features of the present invention will become clearly apparent from the ensuing detailed description of an illustrative embodiment thereof, taken together with the accompanying drawings wherein like reference characters denote like parts throughout the various views.

DESCRIPTION OF THE PREFERRED EMBODIMENT

Figure 1:
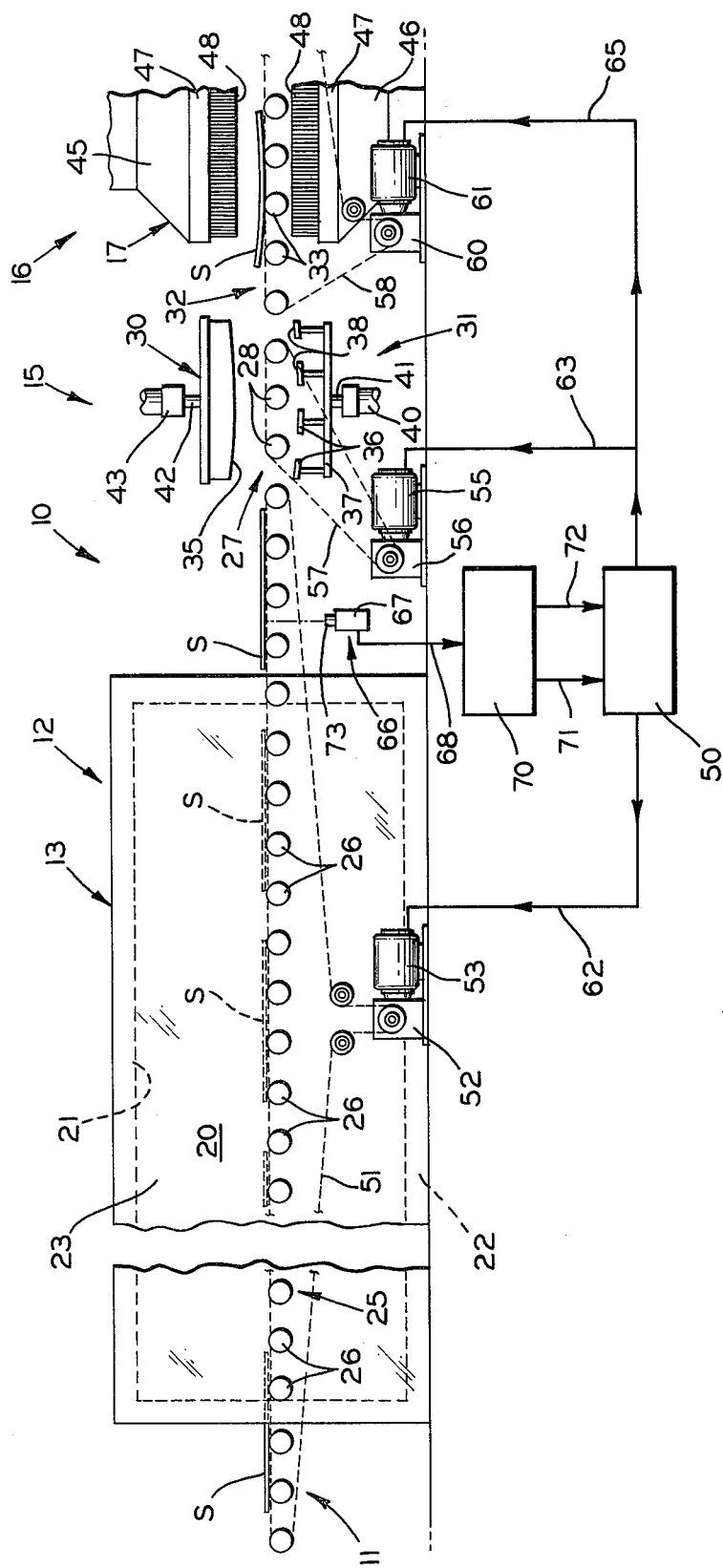
FIG. 1 is a diagrammatic side elevational view of a horizontal press bending operation embodying the novel features of this invention.

Referring now in detail to the illustrative embodiment depicted in the accompanying drawings for carrying out this invention, there is shown diagrammatically in FIG. 1 a glass sheet bending and tempering apparatus, comprehensively designated 10, which includes a continuous conveyor system, generally designated 11, adapted to support a plurality of sheets S in a generally horizontal plane for movement along a continuous, substantially horizontal path through a heating station 12 having a furnace 13 for heating the sheets to their softening point or bending temperature, a bending station 15 having means for bending the heated sheets S to the desired curvature, and a tempering station 16 having chilling means 17 for rapidly reducing the temperature of the reheated sheets to produce the desired temper therein. In the illustrative embodiment, the glass sheets are heated in the furnace 13, which is of the tunnel-type having a pair of side walls 20, a top wall 21, and a bottom wall 22 defining a heating chamber 23. The heating chamber 23 can be heated in any desired manner by suitable heating means, such as gas burners or electrical resistance elements for example (not shown), located in the top and side walls of the furnace 13. Such heating means are suitably controlled by apparatus (also not shown) to obtain the desired temperature at various points in the heating chamber 23. The sheets S are carried through the heating chamber 23 on a first conveyor section 25, forming a part of the conveyor system 11, and extending longitudinally through the furnace 13 and projecting axially outwardly from the opposite ends thereof. The conveyor section 25 comprises a plurality of longitudinally spaced conveyor rolls 26 journalled at their opposite ends in bearing blocks (not shown) located exteriorly of furnace 13 and along the entire length of conveyor section 25.

A plurality of glass sheets S are individually loaded on and supported in a generally horizontal plane on the longitudinally spaced conveyor rolls 26 at the entrance end of furnace 13 and heated in a controlled manner to the desired bending temperature during their passage therethrough. Upon emerging through an opening (not shown) in the exit end of the furnace 13, the heated glass sheets S are transferred from conveyor rolls 26 onto a second conveyor section 27, also a part of the conveying system 11, and which are comprised of a series of spaced conveyor rolls 28 journalled at their opposite ends in suitable bearing blocks (not shown) located along and on opposite sides of the bending station 15. The series of rolls 28 support the glass sheets S horizontally for movement into and within the bending station 15 between a pair of complementary press mold members 30 and 31, before and after bending, and then convey them to the tempering station 16, whereat the bent glass sheets are transferred from conveyor rolls 28 onto a third conveyor section 32, also a part of the conveying system, and which are comprised of a series of spaced conveyor rolls 33 journalled at their opposite ends in suitable bearing blocks (not shown) located along and on opposite sides of the tempering station 16.

The upper male mold member 30 and the lower female mold member 31 have opposed complemental shaping surfaces conforming in curvature to the shape of the sheets when bent and which are mounted for relative movement toward and away from each other. The male mold member 30 has a downwardly directed, generally convex shaping surface 35 and is mounted above the rolls 28 while the female mold member 31 is located below the conveyor rolls 28 and mounted for vertical movement toward and away from the male mold member 30. To permit displacement of the female mold member 31 above the level of conveyor rolls 28 for lifting the sheets S thereabove, such member 31 is formed of a plurality of segments 36 mounted on a carriage 37 and spaced apart a sufficient distance to allow the segments 36 to pass between adjacent rolls 28. The segments 36 form a composite, ring-type structure having a generally concave shaping surface 38 complementary to the shaping surface 35 of male mold member 30.

The carriage 37 is vertically movable by fluid actuator 40 having a suitable piston rod 41 for raising and lowering the female mold member 31 between a lower position below conveyor rolls 28 and an upper position thereabove for lifting a heated glass sheet S from the conveyor rolls 28 and pressing the same against male mold member 30 between the complemental shaping surfaces 35 and 38, thus forming the glass sheet into the desired curvature. The male mold member 30 also can be mounted for vertical movement, if desired, by suspending the same from the piston rod 42 of a fluid actuator 43.

The chilling means 17 in tempering station 16 comprises upper and lower blastheads 45 and 46 disposed above and below the path of movement of the glass sheets and are operable to direct opposed blasts of cooling fluid, such as air for example, toward and against the opposite surfaces of the bent sheets S moving along such path on conveyor section 32. To this end, the blastheads 45 and 46 include plenum chambers 47, respectively, having a plurality of tubes 48 projecting outwardly therefrom toward the path of movement of the bent sheets to direct a plurality of streams of cooling gases from a suitable supply source via plenum chambers 47 toward the opposite surfaces of the bent glass sheet.

It should be understood that the rate of movement of the sheets S during each phase of the operation is controlled, as by means of a motor controller 50 for example, to be commensurate with the operation being performed on the sheet during that phase. Thus, the speed of movement of the sheets is varied along the conveyor system 11 as determined by the process being carried out so that the sheets pass through the heating chamber 23 on conveyor section 25 at a first speed, through the bending station 15 on conveyor section 27 at a second rate of speed, e.g. generally a faster speed to reduce to a minimum heat losses occurring during this transfer, and through the tempering station 16 on conveyor section 32 at a third rate of speed, generally at a slower rate to assure adequate exposure of the sheets to the cooling medium. Accordingly, the glass sheets are moved through the apparatus 10 at preselected rates of relatively fast or slower rates of speed commensurate with the desired periods of time in which they are moved through and from one station to another.

As shown in FIG. 1, the conveyor rolls 26 of conveyor section 25 are driven in common, via an endless drive chain 51, from a suitable gear reduction mechanism 52 operably connected to a variable speed power source or electric motor 53. Rolls 28 of conveyor section 27 are driven in common from a variable speed motor 55 via gear reduction means 56 and endless drive chain 57. Likewise, rolls 33 of conveyor section 32 are commonly driven by an endless drive chain 58 operatively connected, via gear reduction mechanism 60, to a variable speed motor 61. The variable speed electric motors 53, 55 and 61 are all operatively connected to motor controller 50, as by means of conducting lines 62, 63 and 65, respectively, so that any adjustments made to vary the speed of motor 53 and thereby the rate of speed of conveyor section 25 for example, as will hereinafter be more fully explained, will effect corresponding adjustments in the rates of speeds of the other conveyor sections to maintain the respective rates of speed proportional.

The temperature of the glass sheets immediately prior to the first processing step is the most critical factor in attaining the desired degree of uniformity of shape and temper in the glass sheets processed in accordance with the above described horizontal press bending operation. For example, the sheets must be heated to a temperature level rendering them sufficiently pliable to impart the desired shape thereto when bending and to retain adequate heat for subsequent tempering, and yet not overheated to the extent that deformation control will be lost whereby the sheets will sag after bending out of the desired shape and also be vulnerable to marking and further distortion by the conveyor rolls.

While the optimum temperature range at which the heated sheets should be processed can be readily calculated and/or determined by experimentation, difficulty is encountered in consistently obtaining this optimum temperature range for a multiplicity of successively heated sheets. This is due to a number of factors, including the degree of loading of the furnace, thermal currents within the furnace, and variations in the output temperature of the several gas fired burners or electrical resistance elements for example, because of fluctuations in the heat value of the fuel supply or the resistance encountered by the electrical power input, respectively.

The present invention contemplates obtaining the desired optimum glass temperature by automatically adjusting the speed of the conveyor section 25 within the heating furnace 13 for increasing or decreasing exposure time of the sheets to heat in accordance with temperature deviations noted in sheets exiting the furnace from the desired temperature value. Where the measured temperature falls below the desired value, the speed of conveyor section 25 is decreased to increase overall heat exposure time of successive sheets being conveyed therethrough and conversely, where the measured temperature is greater than the desired value, the speed of conveyor section 25 is increased to decrease heat exposure time.

To this end, and in accordance with the present invention, a temperature sensing or measuring means 66 is suitably mounted below conveyor section 25 exteriorly of furnace 13 adjacent the exit end thereof and immediately prior to the bending station 15. The temperature measuring means 66 comprises a non-contact, infrared radiation thermometer 67 of the type marketed by Ircon, Inc. of Niles, Ill. under the designation "Modline 3400" Series. The thermometer 67 is operative to determine the temperature of the glass sheets S by quantitatively measuring the radial energy emitted therefrom and generating a signal output in the form of an electrical signal proportional to the glass temperature and which is directed, via line 68, to a controller 70. The controller 70 is, in turn, electrically connected to the motor controller 50 by conducting lines 71 and 72 for transmitting controller output signals thereto to increase or decrease, respectively, the speed of variable speed motor 53 and thereby increase or decrease the rate of speed of conveyor section 25.

Since the bottom surfaces of heated sheets processed in a horizontal press bending operation are the critical surfaces because of their vulnerability to roll marking and undesirable distortion, the temperature readings and data necessary to determine the desired temperature range are derived from such bottom surfaces. Accordingly, the thermometer 67 is mounted below the advancing glass sheets with the sensing head 73 thereof directed upwardly toward the path of movement of the sheets to scan and measure the temperature of the bottom surfaces thereof.

Figure 2:
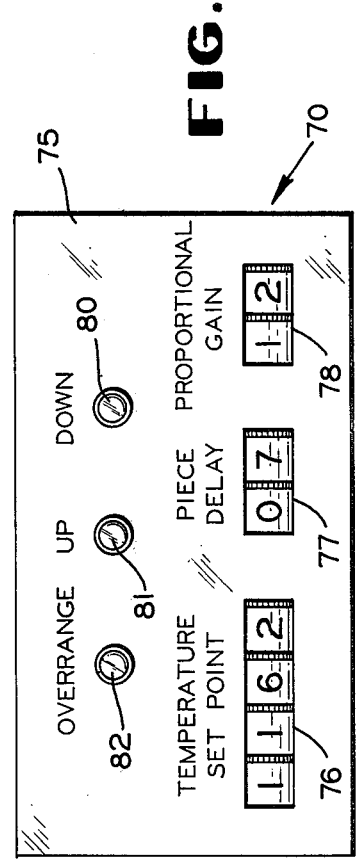
FIG. 2 is a front elevational view of the conveyor speed controller used in conjunction with the present invention.

The controller 70 is a discrete input, time duration, proportioning output computer of the micro-processor type sold by Motorola Semiconductor Products, Inc. of Phoenix, Ariz. under the "M6800" Series designation. Since the controller 70 is a commercially available unit, it is believed that a detailed description of the logic components and micro control circuitry incorporated therein is not necessary and that a functional description only of the operation thereof will suffice. Accordingly, only the housing face 75 of the controller is shown in FIG. 2, with the legends "Temperature Set Point", "Piece Delay" and "Proportional Gain" imprinted thereon above windows 76, 77 and 78, respectively, through which can be viewed indicia imprinted on dials and the like bearing information introduced into the controller 70. Suitable knobs or other manual controls (not shown) can be utilized to adjust these settings, as desired. Also, indicator lamps 80 and 81 are mounted on housing face 75 for providing visual indications of a decrease or increase, respectively, of the rate of speed of conveyor section 25. Energization of lamp 82 indicates that the speed control function of controller 70 has been deactivated and that any conveyor speed adjustments must be effected manually.

The legend "Temperature Set Point" reflects the desired temperature of the glass sheets as they exit the furnace for further processing. The "Proportional Gain" legend determines the duration of the conveyor speed adjustment per unit of temperature deviation from set point and serves as an amplifier or multiplier. It generates an amplified signal transmitted to the motor controller 50 for determining the amount of time that the desired conveyor speed increase or decrease will be effected. The legend "Piece Delay" establishes the number of sheets that will pass the temperature measuring means 66 after a correction has been made. Preferably, this number equals the number of sheets contained and being processed in the heating furnace 13 at any given time. The specific settings shown in FIG. 2 are exemplary only and will vary as dictated by the thickness and outside dimensions of the sheets being processed, as well as the subsequent processing steps anticipated.

Basically, the controller 70 reads the output of thermometer 67 each time a heated glass sheet advances past the sensing head 73 toward the bending station 15. The controller determines the deviation of this electrical signal input, which is proportional to the glass temperature, from the desired temperature or "temperature set point" previously established in the unit. This generates an "error value" which is stored in the control unit until the error values of five successive sheets have been recorded. Then, the controller 70 computes the average error value from these five recorded errors. Alternatively, instead of determining the error value for each temperature reading before deriving the average error, the average of five successive temperature measurements can be calculated before comparing such average temperature to the temperature set point, if desired, to obtain the average error. In either event, utilizing an average error value prevents unnecessary and/or erratic speed changes due to slight temperature variations in successive sheets. Also, it should be understood that the number of temperature readings employed to determine the average can vary, as desired.

Average temperature deviations from set point within ± 2° F are well within allowable tolerances to efficiently further process the heated sheets and the conveyor speed change function of controller 70 does not become operative under such conditions. When the average error value is ± 2° F or more from the set point value, the controller 70 becomes operative to generate a signal directed via lines 71 or 72 to motor controller 50 which transmits the signal to variable speed motor 53 to progressively increase or decrease the rate of speed of conveyor section 25. This average error value also is amplified by the "Proportional Gain" factor to produce a signal that establishes the duration of the conveyor speed variation. By way of example, if each unit of "Proportional Gain" is 1/100 of a second and the deviation of the average error from set point is ± 2° F, the signal progressively stepping up motor 53 to in turn progressively increase the speed of conveyor section 25 would have a duration of 2 × 12/100 seconds or 24/100 of a second. Once the conveyor speed is adjusted or updated, further corrections are inhibited until the indicated number of sheets ("Piece Delay") have passed the temperature sensing means 66. This delay is introduced to prevent subsequent erratic oscillations in conveyor speed due to controller over-corrections. After the delay, the above cycle is repeated to establish another conveyor speed adjustment or update, if necessary. Thus, controller 70 is operable to continuously monitor and correct the rate of speed of conveyor section 25 to thereby control exposure time of the sheets in furnace 13 and maintain the temperature of the heated sheets at substantially the set point value immediately prior to further processing.

As noted above, the controller 70 becomes operative to adjust conveyor speed upon temperature deviations of or greater than ± 2° F from set point. However, an upper temperature deviation limit, say ± 20° F for example, is imposed on the controller 70 to deactivate the same and preclude erratic variations in conveyor speed. Such extreme temperature deviations might result from a fuel supply failure, a malfunction of the temperatue sensing means, or some other drastic system malfunction. In such event, when the average temperature deviation reaches ± 20° F, the controller 70 becomes inactive while triggering an audible alarm and energizing lamp 82 to provide a visual indication to warn the operator that controller 70 is disabled and that the system is in condition for manual control.

The mode of operation is as follows:

With the "Temperature Set Point", "Piece Delay" and "Proportional Gain" data, previously established for the specific glass sheet to be processed, introduced into the controller 70, a plurality of such glass sheets S are individually loaded on and supported in a generally horizontal plane on the longitudinally spaced conveyor rolls 26 of conveyor section 25 adjacent the entrance end of furnace 13. The sheets are heated in a controlled manner to the desired bending temperature during their passage through furnace 13. Upon exiting the furnace 13, each sheet passes the sensing head 73 of thermometer 67, which measures the temperature of the sheet and transmits a signal, proportional to the temperature, to controller 70. The controller 70 determines the deviation of measured temperature from set point and, when the error values of five successive sheets are recorded, computes the average error value. If the average error value deviates ± 2° F from set point, a corresponding signal is transmitted to motor controller 50 which directs a command signal or constant pulse, via line 62, to motor 53 to vary the speed thereof and increase or decrease the rate of speed of conveyor sections 25, as required. The speed increase or decrease is visually indicated on the appropriate lamp 81 or 80. The average error value also is multiplied by the proportional gain factor to establish the duration of the speed variation of conveyor section 25. After the speed correction is initiated, another will not occur until the number of sheets equalling "Piece Delay" have advanced past the temperature sensing means 66. After the passage of this predetermined number of sheets, the controller 70 will then be conditioned to accept new temperature measurements for another speed adjustment, if necessary.

From the foregoing, it is apparent that the objects of the present invention have been fully accomplished. As a result of this invention, an improved method and apparatus is provided for accurately controlling the temperature of heated glass sheets in a manner maintaining the sheets at substantially optimum temperatures for further processing. In accord with the invention, this is accomplished by controlling the heat exposure duration of the sheets in a heating furnace by automatically adjusting the speed of advancement of the sheets therethrough in response to temperature variations noted in heated glass sheets exiting the furnace.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

I claim:

1. A method of accurately controlling the temperature of heated glass sheets comprising: supporting a plurality of glass sheets in a substantially horizontal plane and moving the same bodily in a generally horizontal path through a heating furnace at a preselected rate of speed, heating said sheets as they are advanced through said furnace, measuring the individual temperatures of a given series of heated glass sheets exiting the furnace and determining the average temperature deviation of said series of heated glass sheets from a desired temperature, varying the rate of speed of said glass sheets in said furnace in accordance with the amount of deviation of said average temperature from said desired temperature to vary the duration of time said sheets moving through said furnace are exposed to heat, and varying the duration of speed change in accordance with the amount of deviation of said average temperature from said desired temperature.

2. A method according to claim 1, wherein said glass sheets are heated substantially to the softening points thereof in said furnace, and bending said heated sheets after measuring the temperatures thereof.

3. A method according to claim 2, including cooling said bent sheets rapidly for tempering the same immediately after bending.

4. Apparatus for accurately controlling the temperature of heated glass sheets comprising: a heating furnace, a conveyor for supporting a plurality of glass sheets in a substantially horizontal plane and moving the same bodily along a generally horizontal path through said heating furnace at a preselected rate of speed, means in said furnace for heating said sheets, means exteriorly of said furnace for measuring the individual temperatures of a given series of heated glass sheets exiting the furnace, means computing the average temperature deviation of said series of heated glass sheets from a desired temperature, control means responsive to said average temperature deviation for generating a signal to vary the rate of speed of said conveyor to adjust the heat exposure time of said sheets moving through said furnace, and said control means including means for varying the duration of said signal in accordance with the variation in the temperature deviation.

5. Apparatus according to claim 4, wherein said temperature measuring means is mounted below said conveyor adjacent the exit end of said furnace and is provided with a sensing head directed upwardly toward said horizontal path to observe the temperature of sheets advanced therealong.

6. Apparatus according to claim 4, wherein said temperature measuring means is a non-contact, infrared radiation thermometer mounted below said conveyor in spaced relation to said advancing sheets exiting said furnace.

7. Apparatus according to claim 4, including means for driving said conveyor at said preselected rate of speed, and said signal generated by said control means being transmitted to said drive means for varying the rate of speed of said conveyor.

8. Apparatus according to claim 4, including means for disabling said control means to discontinue varying the rate of speed of said conveyor upon the attainment of a predetermined amount of temperature deviation from said desired temperature.

9. Apparatus according to claim 4, in combination with means downstream of said temperature measuring means for bending said heated sheets to desired shapes, and chilling means for tempering said bent sheets.

* * * * *